July 2, 1940.   R. H. LINABERRY   2,206,612
RAKE
Filed Feb. 20, 1939   2 Sheets-Sheet 1

Inventor
R. H. Linaberry

By Clarence A. O'Brien
and Hyman Berman
Attorneys

July 2, 1940. R. H. LINABERRY 2,206,612
RAKE
Filed Feb. 20, 1939 2 Sheets-Sheet 2
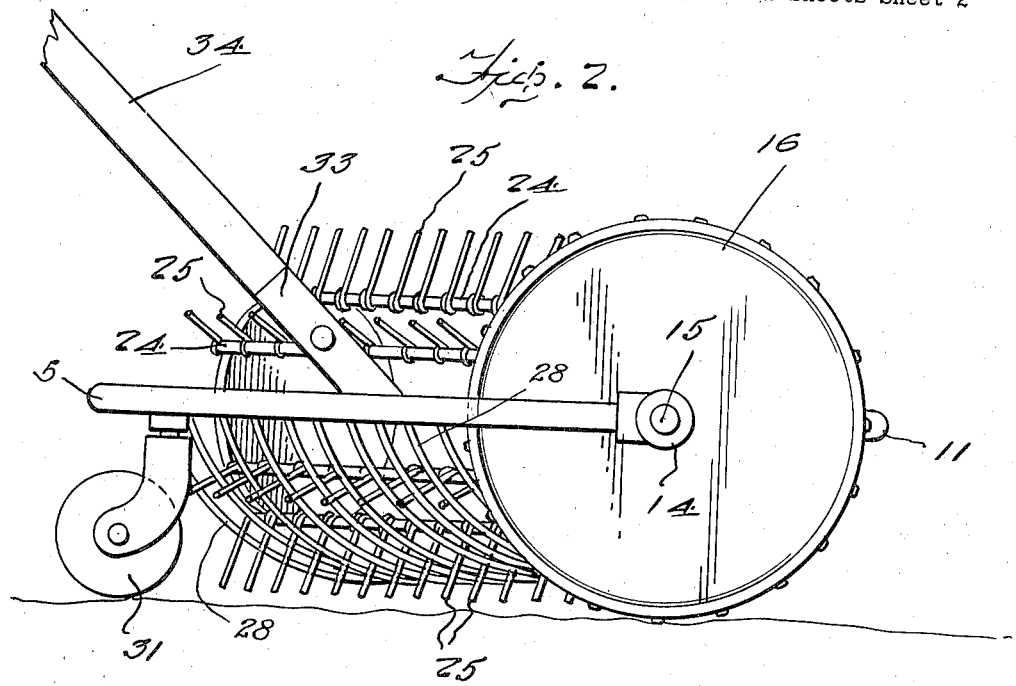
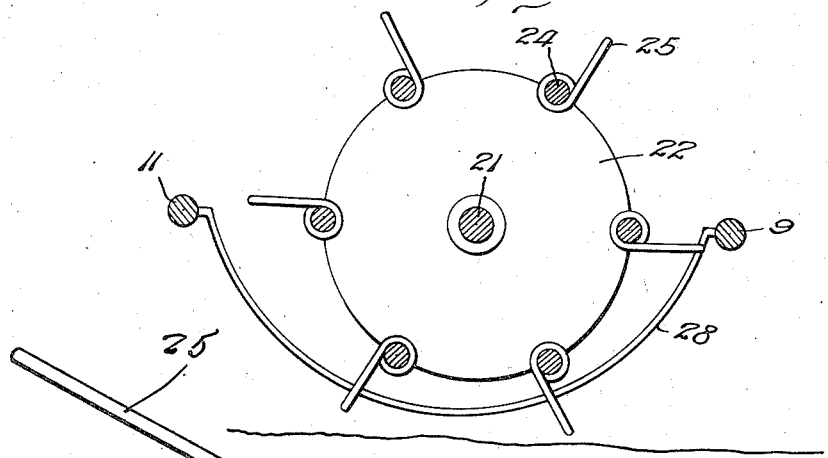
Inventor
R. H. Linaberry
By Clarence A. O'Brien
and Hyman Berman
Attorneys Patented July 2, 1940

2,206,612

UNITED STATES PATENT OFFICE 2,206,612

RAKE

Robert H. Linaberry, Arnolds Park, Iowa

Application February 20, 1939, Serial No. 257,497

2 Claims. (Cl. 56—400.02)

This invention appertains to new and useful improvements in rakes especially adapted for yards, lawns, and other limited areas.

The principal object of the present invention is to provide a rake for the use specified which will rake grass, debris, and other materials in a manner whereby the materials can be subsequently gathered in an easy and convenient manner.

Another important object of the invention is to provide a hand rake of the sides delivery type which in use will be efficient and easy to operate.

These and other objects and advantages of the invention will become apparent to the reader of the following specification.

In the drawings:

Figure 2 is a fragmentary side elevation.

Figure 3 is a section on line 3—3 of Figure 1.

Figure 4 is a detailed sectional view showing one of the fingers.

Figure 1:
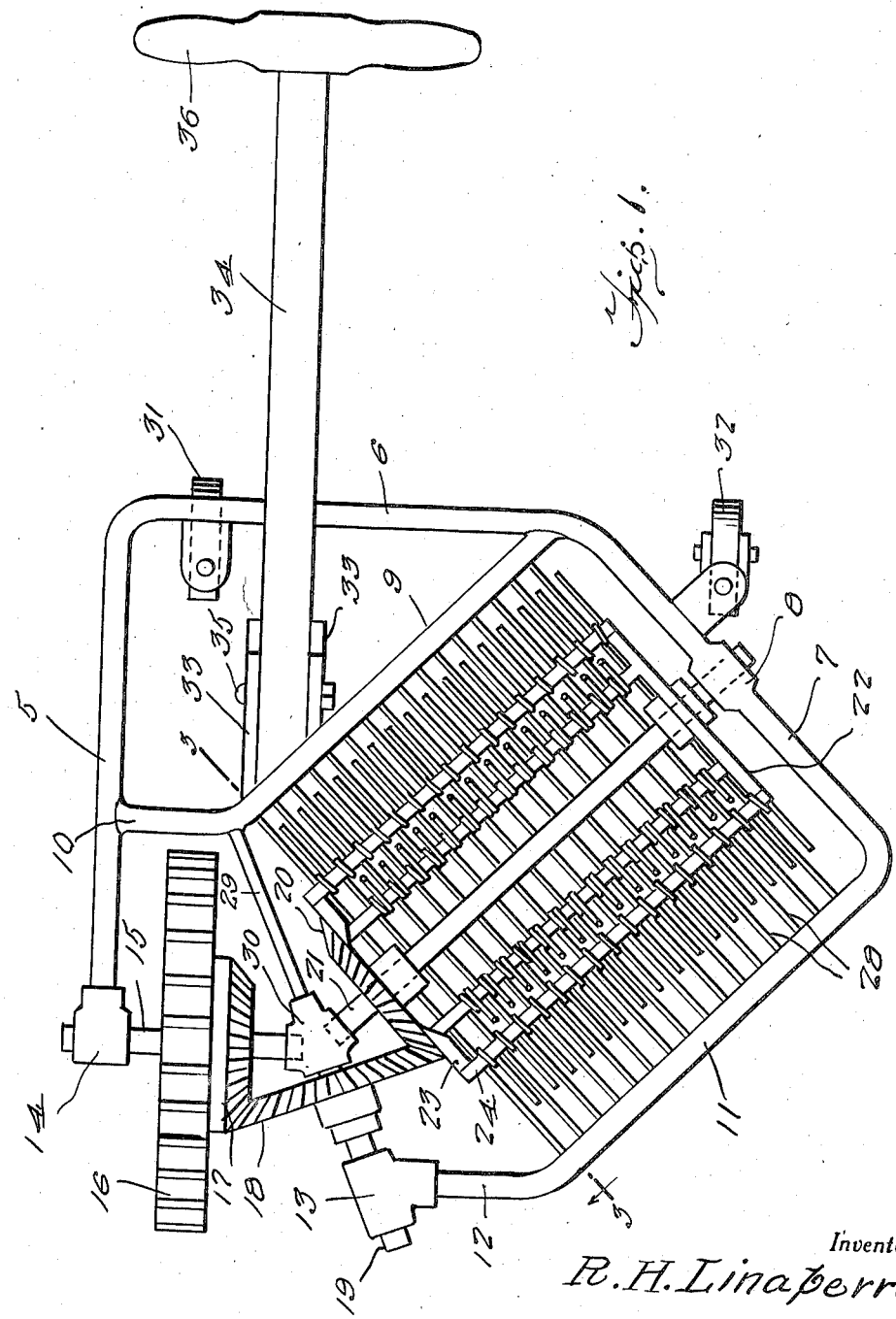
Figure 1 represents a top plan view.

Referring to the drawings wherein like numerals designate like parts, it can be seen that the rake consists of a frame made up of the bar 5 which merges with the rear cross-member 6 and the latter in turn merges with the forwardly diverged extension 7 which has a bearing 8 at its intermediate portion.

Extending from the merging point of the portions 6 and 7 is the frame bar 9 which diverges as at 10 to connect to the bar 5 at its intermediate portion.

A front bar 11 extends from the forward end of the extension 7 and is in parallel relation to the frame bar 9, the bar 11 having an oblique portion 12 terminating in the bearing 13. The forward end of the bar 5 terminates in the bearing 14 for receiving the shaft 15 on which is the drive wheel 16. The drive wheel 16 carries the bevel gear 17 which meshes with the bevel gear 18 on the shaft 19, the latter being disposed through the bearing 13. The gear 18 in turn meshes with the bevel gear 20 on the shaft 21. The gear 20 is freely rotatable on the shaft 21. The gear 20 forms one end wall of the reel which is complementary to the end plate 22 at the opposite end of the reel. Lugs 23 projecting radially from the gear 20 have the reel rods 24 extending therefrom and they connect the peripheral portion of the disk 22.

The reel is completed by the presence of the spring fingers 25. The rods 24 are preferably channeled circumferentially at equal spaced intervals as at 26 to receive the convoluted ends 27 of the said fingers 25. These fingers are carried by the reel structure made up of the gear 20, disk 22 and rods 24 and serve to rake the material in the path thereof. As the reel rotates, the fingers 25 are cleaned by passing between the arcuate rods 28 which extend from the frame bar 9 to the frame bar 11, the same curving downwardly to pass under the said reel before described.

A brace member 29 extends from the bearing block 30 to the frame bar 9 as is clearly shown in Figure 1.

The rear bar 6 and the extension 7 are provided with caster wheels 31 and 32. Straps 33 extend upwardly from the frame bar 9 at opposite sides of the lower portion of the hand bar 34. A bolt, or bolts 35 serve to connect the hand bar to the straps 33 and the upper end of the hand bar is provided with the handle 36.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A rake structure comprising a frame consisting of a side member, a member disposed laterally from the side member, a pair of parallel bars extending inwardly from the lateral member in oblique relation with respect to the said side member, a ground engaging wheel at one end of the side member, a rotary rake mounted between the parallel bars, and gear means between the ground-engaging wheel and the adjacent end of the rotary rake, the forwardmost bar provided with a bearing at its free end, a shaft extending through the bearing, a gear carried by the ground engaging wheel, a gear carried by the rake, and an intermediate gear meshing with the aforementioned gears and mounted on the said shaft.

2. A rake structure comprising a frame consisting of a side member, a member disposed laterally from the side member, a pair of parallel bars extending inwardly from the lateral member in oblique relation with respect to the said side member, a ground engaging wheel at one end of the side member, a rotary rake mounted between the parallel bars, and gear means between the ground-engaging wheel and the adjacent end of the rotary rake, the forwardmost bar provided with a bearing at its free end, a shaft extending through the bearing, a gear carried by the ground engaging wheel, a gear carried by the rake, and an intermediate gear meshing with the aforementioned gears and mounted on the said shaft, the rearwardmost parallel bar being extended to connect to the side member, a rod extending from the last mentioned parallel bar at a point adjacent the side member and in a forward direction and provided at its forward end with a supporting structure for the said gears.

ROBERT H. LINABERRY.